(12) United States Patent
Shimizu et al.

(10) Patent No.: US 12,503,103 B2
(45) Date of Patent: Dec. 23, 2025

(54) VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

(71) Applicant: TOYOTA JIDOSHA KABUSHIKI KAISHA, Toyota (JP)

(72) Inventors: Kenichi Shimizu, Susono (JP); Takashi Hasegawa, Kanagawa-ken (JP); Yuma Hoshikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 240 days.

(21) Appl. No.: 18/346,539

(22) Filed: Jul. 3, 2023

(65) Prior Publication Data

US 2024/0109534 A1 Apr. 4, 2024

(30) Foreign Application Priority Data

Sep. 30, 2022 (JP) .................................. 2022-158195

(51) Int. Cl.
*B60W 30/09* (2012.01)
*B60W 30/095* (2012.01)
*B60W 40/06* (2012.01)

(52) U.S. Cl.
CPC ........ *B60W 30/09* (2013.01); *B60W 30/0956* (2013.01); *B60W 40/06* (2013.01)

(58) Field of Classification Search
CPC .. B60W 30/09; B60W 30/0956; B60W 40/06; B60W 10/184; B60W 2556/40; B60W 2556/50; B60W 30/18054; B60W 30/18027; B60W 50/00; B60W 2050/009; B60W 2050/0095; B60T 2201/022; B60T 2210/32; B60T 7/22; B60T 8/17558
See application file for complete search history.

(56) References Cited

U.S. PATENT DOCUMENTS 8,571,743 B1 * 10/2013 Cullinane ....... B60W 30/18154
701/23
9,105,190 B2 8/2015 Akiyama
9,393,960 B2 7/2016 Kodaira
(Continued)

FOREIGN PATENT DOCUMENTS

JP 2012056347 A * 3/2012
JP 2019-084984 A 6/2019

*Primary Examiner* — Daniel M. Robert
(74) *Attorney, Agent, or Firm* — Sughrue Mion, PLLC

(57) ABSTRACT

A vehicle driving assistance apparatus executes a braking assistance control to forcibly stop an own vehicle when there is a probability that the own vehicle collides with an object, and executes a stopped-state keeping control to keep the own vehicle stopped when the own vehicle is stopped by the braking assistance control. The apparatus executes the stopped-state keeping control for a standard time when the own vehicle is stopped at a place in an area other than a termination recommendation area in which an execution of the stopped-state keeping control is recommended to be terminated. The apparatus executes the stopped-state keeping control for a time shorter than the standard time when the own vehicle is stopped at a place in the termination recommendation area.

7 Claims, 6 Drawing Sheets

(56) References Cited

U.S. PATENT DOCUMENTS

| | | | |
|---|---|---|---|
| 9,483,945 | B2 | 11/2016 | Okita et al. |
| 9,873,412 | B2 | 1/2018 | Moriizumi |
| 10,793,147 | B2 | 10/2020 | Kaminade et al. |
| 2016/0335892 | A1* | 11/2016 | Okada .................... G08G 1/164 |
| 2017/0349168 | A1* | 12/2017 | Meinhart ............ B60W 30/095 |
| 2019/0066515 | A1* | 2/2019 | Dyer .................. G01C 21/3438 |
| 2019/0389457 | A1* | 12/2019 | Mielenz ............ B60W 50/0097 |
| 2020/0262421 | A1* | 8/2020 | Ito .......................... B60W 10/18 |
| 2020/0262422 | A1 | 8/2020 | Kamiya et al. |
| 2020/0339155 | A1* | 10/2020 | Fukumoto ......... B60W 60/0015 |
| 2021/0061309 | A1 | 3/2021 | Kawanai |
| 2021/0107521 | A1 | 4/2021 | Fujita et al. |
| 2021/0107528 | A1 | 4/2021 | Fujita et al. |
| 2021/0146956 | A1 | 5/2021 | Fujita et al. |
| 2021/0146958 | A1 | 5/2021 | Tanaka et al. |
| 2024/0109534 | A1* | 4/2024 | Shimizu ................ B60W 40/06 |

\* cited by examiner

VEHICLE DRIVING ASSISTANCE APPARATUS, VEHICLE DRIVING ASSISTANCE METHOD, AND COMPUTER-READABLE STORAGE MEDIUM STORING VEHICLE DRIVING ASSISTANCE PROGRAM

CROSS-REFERENCE TO RELATED APPLICATIONS

This application claims priority to Japanese patent application No. JP 2022-158195 filed on Sep. 30, 2022, the content of which is hereby incorporated by reference in its entirety.

BACKGROUND

Field

The invention relates to a vehicle driving assistance apparatus, a vehicle driving assistance method, and a computer-readable storage medium storing a vehicle driving assistance program.

Description of the Related Art

There is known a vehicle driving assistance apparatus which executes a braking assistance control to forcibly apply a braking force to an own vehicle and stop the own vehicle in order to avoid the own vehicle from colliding with an object ahead of the own vehicle. Further, there is also known a vehicle driving assistance apparatus which executes a stopped-state keeping control to keep the own vehicle stopped after the own vehicle is stopped by the braking assistance control (for example, see JP 2019-84984 A1). Basically, the known vehicle driving assistance apparatus terminates executing the stopped-state keeping control when a certain time elapses. However, when the own vehicle is stopped just before a traffic intersection by the braking assistance control, the known vehicle driving assistance apparatus does not terminate executing the stopped-state keeping control even when the certain time elapses. Instead, the known vehicle driving assistance apparatus terminates executing the stopped-state keeping control when an accelerator pedal is operated. Thereby, the known vehicle driving assistance apparatus prevents the own vehicle from accidentally entering into the traffic intersection due to terminating executing the stopped-state keeping control. Thereby, the known vehicle driving assistance apparatus avoids the own vehicle from colliding with the other vehicle due to the own vehicle accidentally entering into the traffic intersection.

In this regard, when the own vehicle is stopped at a place in a rail crossing by the braking assistance control, and the own vehicle is kept stopped there for a long time, damage that a train collides with the own vehicle, may arise. Therefore, when the own vehicle is stopped by the braking assistance control at a place in an area in the rail crossing, i.e., a place in an area in which the own vehicle should not be stopped for a long time, an execution of the stopped-state keeping control should be terminated early in order to render the own vehicle movable from there.

SUMMARY

An object of the invention is to provide a vehicle driving assistance apparatus, a vehicle driving assistance method, and a computer-readable storage medium storing a vehicle driving assistance program which can prevent damage due to keeping the own vehicle stopped for a long time.

A vehicle driving assistance apparatus according to the invention comprises an electronic control unit. The electronic control unit is configured to execute a braking assistance control to forcibly apply a braking force to an own vehicle and stop the own vehicle when there is a probability that the own vehicle collides with an object ahead of the own vehicle. In addition, the electronic control unit is configured to execute a stopped-state keeping control to keep the own vehicle stopped when the own vehicle is stopped by the braking assistance control. The electronic control unit is further configured to execute the stopped-state keeping control for a standard time when a first condition is satisfied. The first condition is a condition that the own vehicle is stopped by the braking assistance control at a place in an area other than a termination recommendation area in which an execution of the stopped-state keeping control is recommended to be terminated. The electronic control unit is further configured to execute the stopped-state keeping control for a time shorter than the standard time when a second condition is satisfied. The second condition is a condition that the own vehicle is stopped by the braking assistance control at a place in the termination recommendation area.

When the own vehicle is stopped by the braking assistance control at the place in the termination recommendation area in which the execution of the stopped-state keeping control is recommended to be terminate, i.e., an area in which the own vehicle should not be stopped for a long time, the execution of the stopped-state keeping control should be terminated early in order to render the own vehicle movable from the place.

With the vehicle driving assistance apparatus according to the invention, when the own vehicle is stopped at the place in the termination recommendation area by the braking assistance control, the execution of the stopped-state keeping control is terminated early, and the own vehicle can be moved from there. Thus, damage due to keeping the own vehicle stopped for a long time, can be prevented.

According to an aspect of the invention, the first condition may include a condition that the own vehicle is stopped by the braking assistance control at a place in an area other than a continuation recommendation area in which the execution of the stopped-state keeping control is recommended to be continued. In this aspect, the electronic control unit may be configured to execute the stopped-state keeping control for a time longer than the standard time when the own vehicle is stopped by the braking assistance control at a place in the continuation recommendation area.

With the vehicle driving assistance apparatus according to this aspect of the invention, when the own vehicle is stopped at the place in the termination recommendation area by the braking assistance control, the execution of the stopped-state keeping control is terminated early, and the own vehicle can be moved from there. Thus, the damage due to keeping the own vehicle stopped for a long time, can be prevented.

According to another aspect of the invention, the termination recommendation area may include at least one of an area in a rail crossing, an area in a tunnel, an area on a top of a slope, an area of a curved road, and an area in a traffic intersection.

When the own vehicle is stopped in the area in the rail crossing for a long time, damage that a train collides with the own vehicle, may arise. Further, when the own vehicle is stopped in the area in the tunnel, the area on the top of the slope, the area of the curved road, and the area in the traffic intersection for a long time, damage that another vehicle collides with the own vehicle, may arise.

With the vehicle driving assistance apparatus according to this aspect of the invention, the termination recommendation area includes at least one of the area in the rail crossing, the area in the tunnel, the area on the top of the slope, the area of the curved road, and the area in the traffic intersection. Thus, the damage due to keeping the own vehicle stopped for a long time, can be prevented.

According to further another aspect of the invention, the electronic control unit may be configured to determine whether the own vehicle is stopped at the place in the termination recommendation area, based on a present position of the own vehicle and map information.

Whether the own vehicle is stopped at the place in the termination recommendation area, can be determined with high accuracy by determining whether the own vehicle is stopped at the place in the termination recommendation area, based on the map information.

With the vehicle driving assistance apparatus according to this aspect of the invention, whether the own vehicle is stopped at the place in the termination recommendation area, is determined, based on the present position of the own vehicle and the map information. Thus, whether the own vehicle is stopped at the place in the termination recommendation area, can be determined with high accuracy.

A vehicle driving assistance method according to the invention comprises a step of executing a braking assistance control to forcibly apply a braking force to an own vehicle and stop the own vehicle when there is a probability that the own vehicle collides with an object ahead of the own vehicle, and a step of executing a stopped-state keeping control to keep the own vehicle stopped when the own vehicle is stopped by the braking assistance control. The vehicle driving assistance method according to the invention further comprises a step of executing the stopped-state keeping control for a standard time when a first condition is satisfied. The first condition is a condition that the own vehicle is stopped by the braking assistance control at a place in an area other than a termination recommendation area in which an execution of the stopped-state keeping control is recommended to be terminated. The vehicle driving assistance method according to the invention further comprises a step of executing the stopped-state keeping control for a time shorter than the standard time when a second condition is satisfied. The second condition is a condition that the own vehicle is stopped by the braking assistance control at a place in the termination recommendation area.

With the vehicle driving assistance method according to the invention, the damage due to keeping the own vehicle stopped for a long time, can be prevented for the same reasons as the reasons described above.

A computer-readable storage medium according to the invention stores a vehicle driving assistance program. The vehicle driving assistance program is configured to execute a braking assistance control to forcibly apply a braking force to an own vehicle and stop the own vehicle when there is a probability that the own vehicle collides with an object ahead of the own vehicle. In addition, the vehicle driving assistance program is configured to execute a stopped-state keeping control to keep the own vehicle stopped when the own vehicle is stopped by the braking assistance control. The vehicle driving assistance program is further configured to execute the stopped-state keeping control for a standard time when a first condition is satisfied. The first condition is a condition that the own vehicle is stopped by the braking assistance control at a place in an area other than a termination recommendation area in which an execution of the stopped-state keeping control is recommended to be terminated. The vehicle driving assistance program is further configured to execute the stopped-state keeping control for a time shorter than the standard time when a second condition is satisfied. The second condition is a condition that the own vehicle (100) is stopped by the braking assistance control at a place in the termination recommendation area.

With the vehicle driving assistance program according to the invention, the damage due to keeping the own vehicle stopped for a long time, can be prevented for the same reasons as the reasons described above.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
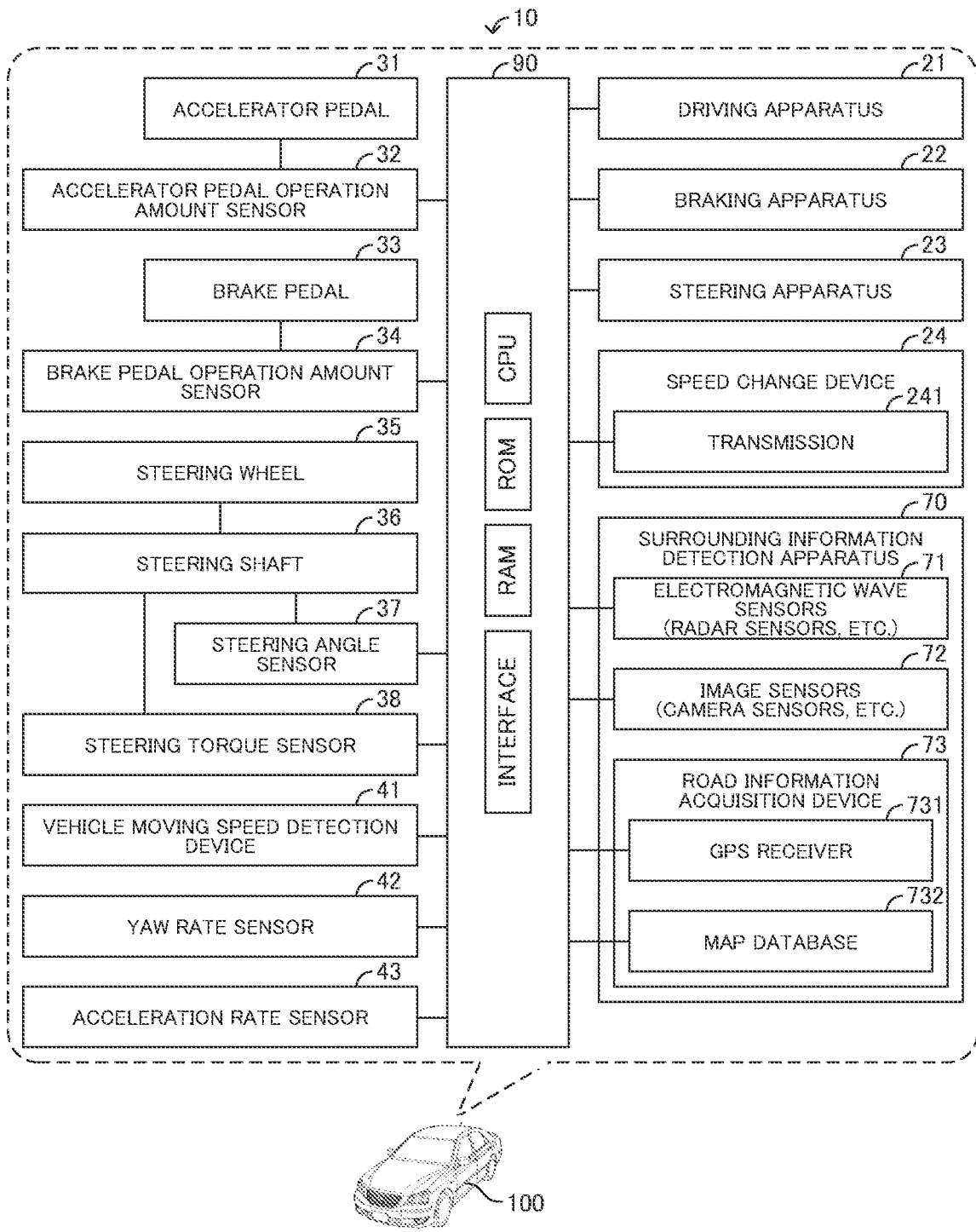
FIG. 1 is a view which shows a vehicle driving assistance apparatus according to an embodiment of the invention.

Below, a vehicle driving assistance apparatus, a vehicle driving assistance method, and a computer-readable storage medium storing a vehicle driving assistance program according to an embodiment of the invention, will be described with reference to the drawings. Below, the vehicle driving assistance apparatus 10 will be described with an example that an operator of an own vehicle 100 is a person who is in the own vehicle 100 and drives the own vehicle 100, i.e., a driver of the own vehicle 100. Therefore, in this embodiment, the vehicle driving assistance apparatus 10 is installed on the own vehicle 100 as shown in FIG. 1.

In this regard, the operator of the own vehicle 100 may be a person who is not in the own vehicle 100 and remotely drives the own vehicle 100, i.e., a remote operator of the own vehicle 100. When the operator of the own vehicle 100 is the remote operator, the vehicle driving assistance apparatus 10 is installed on the own vehicle 100 and remote operation equipment provided outside of the own vehicle 100 to remotely drive the own vehicle 100, respectively. In this case, functions of the vehicle driving assistance apparatus 10 described later are realized by the vehicle driving assistance apparatus 10 installed on the own vehicle 100 and the vehicle driving assistance apparatus 10 installed on the remote operation equipment.

The vehicle driving assistance apparatus 10 includes an ECU 90 as a control device and executes a braking assist control and a stopped-state keeping control described later as an automatic driving control for the own vehicle 100.

<ECU>

The ECU 90 is an electronic control unit. The ECU 90 includes a microcomputer as a main component. The microcomputer includes a CPU, a ROM, a RAM, a non-volatile memory, and an interface. The CPU is configured or programmed to realize various functions by executing instructions, programs, or routines stored in the ROM. In this embodiment, the vehicle driving assistance apparatus 10 includes one ECU. In this regard, the vehicle driving assistance apparatus 10 may include the ECUs and be configured to execute various processes described later by the ECUs, respectively.

<Driving Apparatus, Etc.>

As shown in FIG. 1, the own vehicle 100 is installed with a driving apparatus 21, a braking apparatus 22, a steering apparatus 23, and a speed change device 24.

<Driving Apparatus>

The driving apparatus 21 is an apparatus which outputs a driving force to be applied to the own vehicle 100. The driving apparatus 21 includes, for example, an internal combustion engine and/or at least one electric motor. The driving apparatus 21 is electrically connected to the ECU 90. The ECU 90 controls the driving force output from the driving apparatus 21.

<Braking Apparatus>

The braking apparatus 22 is an apparatus which applies a braking force to the own vehicle 100. The braking apparatus 22 includes, for example, a hydraulic brake apparatus. The braking apparatus 22 is electrically connected to the ECU 90. The ECU 90 controls the braking force applied to the own vehicle 100 by the braking apparatus 22.

<Steering Apparatus>

The steering apparatus 23 is an apparatus which applies a steering force to the own vehicle 100. The steering apparatus 23 includes, for example, a power steering apparatus. The steering apparatus 23 is electrically connected to the ECU 90. The ECU 90 controls the steering force applied to the own vehicle 100 by the steering apparatus 23.

<Speed Change Device>

The speed change device 24 is a device which changes a transmission state of the driving force output from the driving apparatus 21 to the own vehicle 100. In this embodiment, the speed change device 24 includes a transmission 241. The transmission 241 is electrically connected to the ECU 90. The ECU 90 sets a transmission state of the transmission 241 to any one of a forward driving transmission state (or a drive transmission state), a rearward driving transmission state (or a reverse transmission state), a neutral state, and a stopped-state keeping state (or a parking state). The drive transmission state is a state to transmit the driving force to the own vehicle 100 such that the own vehicle 100 moves forward. The reverse transmission state is a state to transmit the driving force to the own vehicle 100 such that the own vehicle 100 moves rearward. The neutral state is a state to stop transmitting the driving force to the own vehicle 100. The parking state is a stat to keep the own vehicle 100 stopped.

<Sensors, Etc.>

Further, the own vehicle 100 is installed with an accelerator pedal 31, an accelerator pedal operation amount sensor 32, a brake pedal 33, a brake pedal operation amount sensor 34, a steering wheel 35, a steering shaft 36, a steering angle sensor 37, a steering torque sensor 38, a vehicle moving speed detection device 41, a yaw rate sensor 42, an acceleration rate sensor 43, and a surrounding information detection apparatus 70.

<Accelerator Pedal, Etc.>

The accelerator pedal 31 is a device which is operated by the driver to accelerate the own vehicle 100. The accelerator pedal operation amount sensor 32 is a device which detects an operation amount of the accelerator pedal 31. When the operator of the own vehicle 100 is the remote operator of the own vehicle 100, the accelerator pedal 31 and the accelerator pedal operation amount sensor 32 are installed on the remote operation equipment.

The accelerator pedal operation amount sensor 32 is electrically connected to the ECU 90. The ECU 90 acquires the operation amount of the accelerator pedal 31 as an accelerator pedal operation amount AP by the accelerator pedal operation amount sensor 32. The ECU 90 calculates and acquires an acceleration rate of the own vehicle 100 requested by the driver as a driver request acceleration rate Ga_driver, based on the accelerator pedal operation amount AP. The ECU 90 executes an ordinary moving control to control the driving force output from the driving apparatus 21 such that the driver request acceleration rate Ga_driver is realized when the driver request acceleration rate Ga_driver is greater than zero except that the ECU 90 executes the braking assistance control described later.

<Brake Pedal, Etc.>

The brake pedal 33 is a device which is operated by the driver to decelerate the own vehicle 100. The brake pedal operation amount sensor 34 is a device which detects an operation amount of the brake pedal 33. When the operator of the own vehicle 100 is the remote operator of the own vehicle 100, the brake pedal 33 and the brake pedal operation amount sensor 34 are installed on the remote operation equipment.

The brake pedal operation amount sensor 34 is electrically connected to the ECU 90. The ECU 90 acquires the operation amount of the brake pedal 33 as a brake pedal operation amount BP by the brake pedal operation amount sensor 34. The ECU 90 calculates and acquires a deceleration rate of the own vehicle 100 requested by the driver as a driver request deceleration rate Gd_driver, based on the brake pedal operation amount BR The ECU 90 executes the ordinary moving control to control the braking force applied to the own vehicle 100 from the braking apparatus 22 such that the driver request deceleration rate Gd_driver is realized when the driver request deceleration rate Gd_driver is greater than zero except that the ECU 90 executes the braking assistance control described later.

<Steering Angle Sensor>

The steering angle sensor 37 is a sensor which detects a rotation angle of the steering shaft 36 with respect to its neutral position. The steering angle sensor 37 is electrically connected to the ECU 90. The ECU 90 acquires the rotation angle of the steering shaft 36 as a steering angle θ by the steering angle sensor 37.

<Steering Torque Sensor>

The steering torque sensor 38 is a sensor which detects a torque input to the steering shaft 36 by the driver by the steering wheel 35. The steering torque sensor 38 is electrically connected to the ECU 90. The ECU 90 acquires the torque input to the steering shaft 36 by the driver by the steering wheel 35 as a driver input torque TQ_driver by the steering torque sensor 38.

<Vehicle Moving Speed Detection Device>

The vehicle moving speed detection device 41 is a device which detects a moving speed of the own vehicle 100. The vehicle moving speed detection device 41 includes, for example, vehicle wheel rotation speed sensors provided on vehicle wheels of the own vehicle 100, respectively. The vehicle moving speed detection device 41 is electrically connected to the ECU 90. The ECU 90 acquires the moving speed of the own vehicle 100 as an own vehicle moving speed V by the vehicle moving speed detection device 41.

The ECU 90 calculates and acquires the steering torque (or a steering torque) requested by the driver as a requested steering force (or a requested steering torque), based on the steering angle θ, the driver input torque TQ_driver, and the own vehicle moving speed V. The ECU 90 controls operations of the steering apparatus 23 such that the steering force corresponding to the requested steering force is applied to the own vehicle 100 from the steering apparatus 23.

<Yaw Rate Sensor>

The yaw rate sensor 42 is a sensor which detects a yaw rate of the own vehicle 100. The yaw rate sensor 42 is electrically connected to the ECU 90. The ECU 90 acquires the yaw rate of the own vehicle 100 as a yaw rate YR by the yaw rate sensor 42.

<Acceleration Rate Sensor>

The acceleration rate sensor 43 is a sensor which detects a longitudinal acceleration rate of the own vehicle 100 (i.e., an acceleration rate of the own vehicle 100 in a longitudinal direction of the own vehicle 100) and a lateral acceleration rate of the own vehicle 100 (i.e., an acceleration rate of the own vehicle 100 in a width or lateral direction of the own vehicle 100). The acceleration rate sensor 43 is electrically connected to the ECU 90. The ECU 90 acquires the acceleration rate of the own vehicle 100 in the longitudinal direction of the own vehicle 100 as a longitudinal acceleration rate Gx and the acceleration rate of the own vehicle 100 in the lateral direction of the own vehicle 100 as a lateral acceleration rate Gy by the acceleration rate sensor 43.

<Surrounding Information Detection Apparatus>

The surrounding information detection apparatus 70 is an apparatus which acquires information on a situation around the own vehicle 100. In this embodiment, the surrounding information detection apparatus 70 includes electromagnetic wave sensors 71, image sensors 72 and a road information acquisition device 73.

<Electromagnetic Wave Sensors>

The electromagnetic wave sensors 71 are sensors which acquire object data, i.e., data on objects around the own vehicle 100. The electromagnetic wave sensors 71 include, for example, radio wave sensor such as radar sensors such as millimeter wave radars, sound wave sensors such as ultrasonic wave sensors such as clearance sonars, and optical sensors such as laser radars such as LiDARs. The electromagnetic wave sensors 71 transmit electromagnetic waves. When the electromagnetic waves are reflected by objects, the electromagnetic wave sensors 71 receives the reflected waves. The object data is information on the transmitted electromagnetic waves and the received reflected waves. The electromagnetic wave sensors 71 are electrically connected to the ECU 90. The ECU 90 acquires the object data as surrounding detection information IS from the electromagnetic wave sensors 71.

Figure 2A:
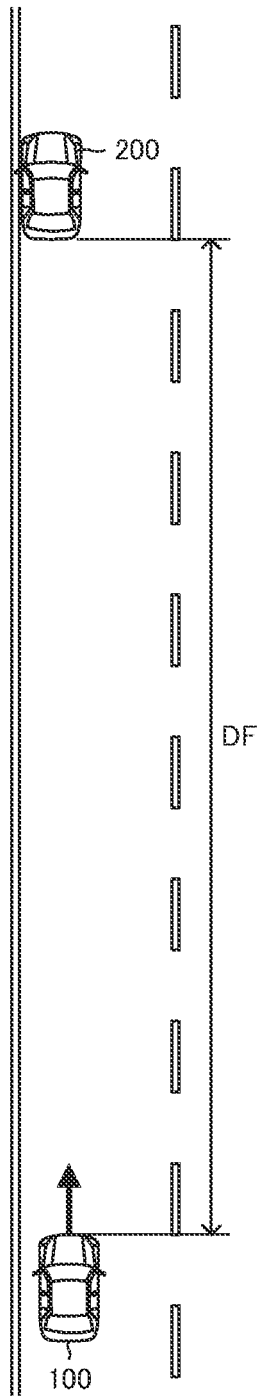
FIG. 2A is a view which shows a scene that there is a vehicle ahead of an own vehicle.
Figure 2B:
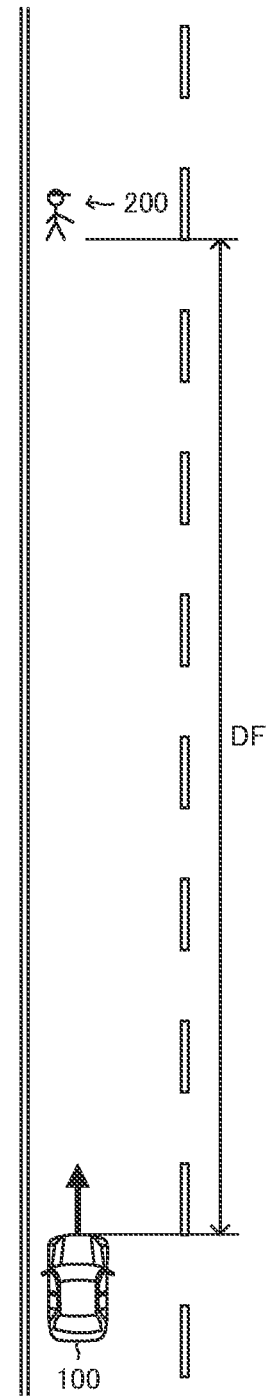
FIG. 2B is a view which shows a scene that there is a person ahead of the own vehicle.

For example, as shown in FIG. 2A and FIG. 2B, when there is an object ahead the own vehicle 100, the ECU 90 detects the object as a forward object 200, based on the object data. The forward object 200 shown in FIG. 2A is a vehicle. The forward object 200 shown in FIG. 2B is a person.

<Image Sensors>

The image sensors 72 are sensors which take images of views around the own vehicle 100 and acquire image data. The image sensors 72 are electrically connected to the ECU 90. The ECU 90 acquires the image data as the surrounding detection information IS from the image sensors 72.

For example, the ECU 90 determines whether the forward object 200 is a vehicle or a person, based on the image data.

<Road Information Acquisition Device>

The road information acquisition device 73 is a device which acquires information on a road on which the own vehicle 100 moves. In particular, in this embodiment, the road information acquisition device 73 is a device which receives GPS signals and acquires a present position of the own vehicle 100 and map information on an area around the own vehicle 100. The map information on the area around the own vehicle 100 includes road information, i.e., information on the road on which the own vehicle 100 moves.

In this embodiment, the road information acquisition device 73 includes a GPS receiver 731 and a map database 732.

The GPS receiver 731 is a device which receives the GPS signals. The GPS receiver 731 is electrically connected to the ECU 90. The ECU 90 acquires the present position of the own vehicle 100, based on the GPS signals received by the GPS receiver 731.

The map database 732 is a device which stores the map information. The map database 732 is electrically connected to the ECU 90. The ECU 90 acquires the map information on the area around the own vehicle 100 as the surrounding detection information IS from the map database 732, based on the present position of the own vehicle 100.

In addition, the ECU 90 acquires positions of rail crossings, tunnels, tops of slopes, crosswalks, curved roads, and traffic intersections, based on the map information. Further, when the own vehicle 100 is stopped by the braking assistance control described later, the ECU 90 determines whether a place where the own vehicle 100 is stopped, is a place in the rail crossing, or in the tunnel, or on the top of the slope, or on the crosswalk, or in the curved road, or in the traffic intersection, based on the map information.

In this embodiment, the surrounding information detection apparatus 70 may include a device which receives information on the road wirelessly transmitted from equipment provided at the side of the road. In this case, the ECU 90 acquires the road information, i.e., information transmitted from the equipment as the surrounding detection information IS. In this case, the ECU 90 acquires the positions of the rail crossings, the tunnels, the tops of the slopes, the crosswalks, the curved roads, and the traffic intersections, based on the road information transmitted from the equipment.

<Operations of Vehicle Driving Assistance Apparatus>

Next, operations of the vehicle driving assistance apparatus 10 will be described. When there is a probability that the own vehicle 100 collides with an object ahead of the own vehicle 100, the vehicle driving assistance apparatus 10 executes the braking assistance control described later.

The vehicle driving assistance apparatus 10 repeatedly execute a process to detect the forward object 200, based on the surrounding detection information IS while the own vehicle 100 moves. While the vehicle driving assistance apparatus 10 does not detect the forward object 200, the vehicle driving assistance apparatus 10 executes the ordinary moving control.

When the vehicle driving assistance apparatus 10 detects the forward object 200, the vehicle driving assistance apparatus 10 determines whether the forward object 200 is in a predicted moving area A100, based on the surrounding detection information IS.

Figure 3:
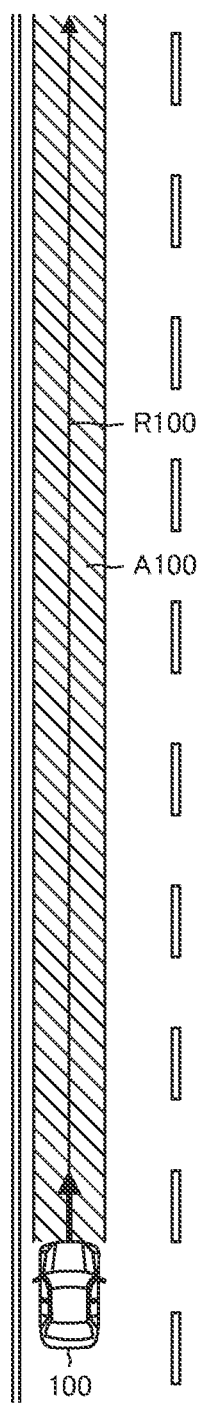
FIG. 3 is a view which shows a predicted moving area.

As shown in FIG. 3, the predicted moving area A100 is an area which has a center line corresponding to a predicted moving route R100 of the own vehicle 100 and a width equal to a width of the own vehicle 100. The predicted moving route R100 is a route along which the own vehicle 100 predictively moves with the current steering angle θ. Therefore, the predicted moving route R100 shown in FIG. 3 is a straight line, but the predicted moving route R100 may be a curved line.

In this embodiment, the vehicle driving assistance apparatus 10 acquires the predicted moving route R100, based on the steering angle θ, the yaw rate YR, and the lateral acceleration rate Gy.

In this embodiment, the vehicle driving assistance apparatus 10 may be configured to determine whether the forward object 200 is any of the vehicle and the person, based on the image data and when the vehicle driving assistance apparatus 10 determines that the forward object 200 is the vehicle or the person, determine whether a braking assistance execution condition is satisfied.

When the detected forward object 200 is not in the predicted moving area A100, the vehicle driving assistance apparatus 10 continues executing the ordinary moving control.

Figure 4A:
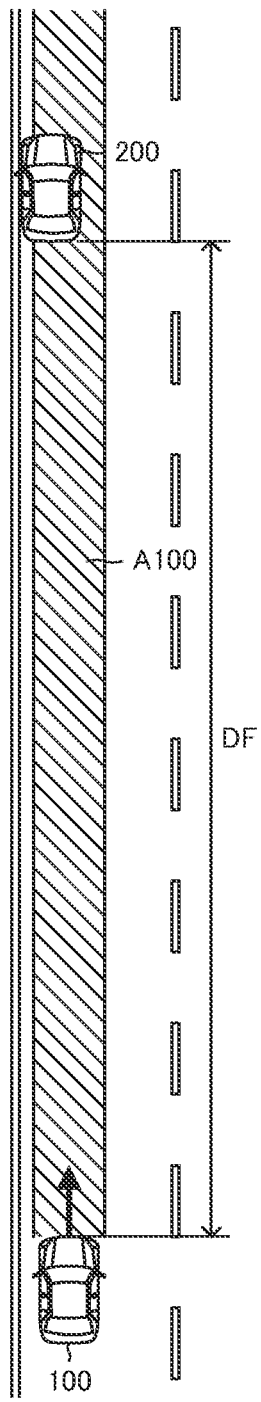
FIG. 4A is a view which shows a scene that there is a forward vehicle in the predicted moving area.

On the other hand, as shown in FIG. 4A, when the detected forward object 200 is in the predicted moving area A100, the vehicle driving assistance apparatus 10 determines whether the braking assistance execution condition is satisfied with respect to the detected forward object 200.

In particular, when the detected forward object 200 is in the predicted moving area A100, the vehicle driving assistance apparatus 10 acquires a collision index value IC. The collision index value IC is a value which indicates the probability that the own vehicle 100 collides with the detected forward object 200. The collision index value IC increases as the probability that the own vehicle 100 collides with the forward object 200, increases.

When the collision index value IC increases to a predetermined value or a predetermined index value IC_th, the vehicle driving assistance apparatus 10 determines that the braking assistance execution condition becomes satisfied.

In this embodiment, the vehicle driving assistance apparatus 10 acquires a predicted reaching time TTC as the collision index value IC and determines that the braking assistance execution condition becomes satisfied when the predicted reaching time TTC decreases to a predetermined time or a predetermined predicted reaching time TTC_th.

The predicted reaching time TTC is a time which the own vehicle 100 predictively takes to reach the forward object 200. The vehicle driving assistance apparatus 10 acquires the predicted reaching time TTC by dividing a forward object distance DF by a relative speed $\Delta V$ (TTC=DF/$\Delta V$). Therefore, when the relative speed $\Delta V$ is constant, the predicted reaching time TTC decreases as the own vehicle 100 approaches the forward object 200.

While the vehicle driving assistance apparatus 10 determines that the forward object 200 is in the predicted moving area A100, the vehicle driving assistance apparatus 10 repeatedly acquires a distance between the forward object 200 and the own vehicle 100 as the forward object distance DF, repeatedly acquires a relative speed of the own vehicle 100 with respect to the forward object 200 as the relative speed $\Delta V$, executes a process to acquire the predicted reaching time TTC, based on the forward object distance DF and the relative speed $\Delta V$ with a predetermined calculation cycle, and determines whether the predicted reaching time TTC decreases to the predetermined predicted reaching time TTC_th each time the vehicle driving assistance apparatus 10 acquires the predicted reaching time TTC.

In this embodiment, the vehicle driving assistance apparatus 10 acquires the forward object distance DF and the relative speed $\Delta V$, based on the surrounding detection information IS.

When the predicted reaching time TTC is longer than the predetermined predicted reaching time TTC_th, that is, the braking assistance execution condition is not satisfied, the vehicle driving assistance apparatus 10 continues executing the ordinary moving control.

Figure 4B:
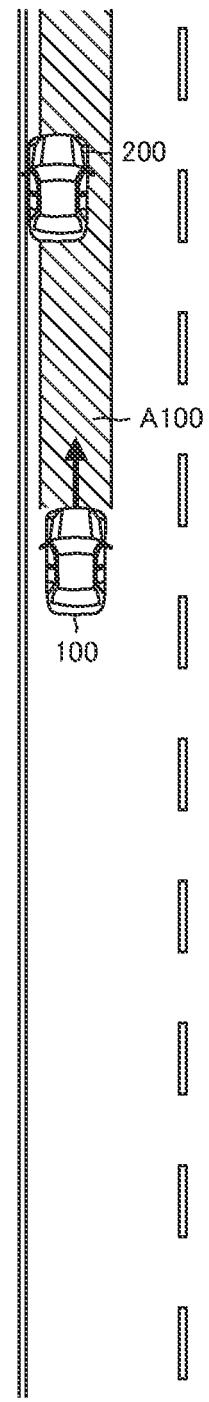
FIG. 4B is a view which shows a scene that the own vehicle arrives at a point near the forward vehicle.

On the other hand, as shown FIG. 4B, when the own vehicle 100 approaches the forward object 200, and the predicted reaching time TTC decreases to the predetermined predicted reaching time TTC_th, the vehicle driving assistance apparatus 10 determines that the braking assistance execution condition becomes satisfied. When the braking assistance execution condition becomes satisfied, the vehicle driving assistance apparatus 10 starts executing the braking assistance control.

The braking assistance control is a control to control the driving force applied to the own vehicle 100 to zero and forcibly apply the braking force to the own vehicle 100 and stop the own vehicle 100 before the forward object 200, independently of whether the driver operates the accelerator pedal 31 or the brake pedal 33.

When the vehicle driving assistance apparatus 10 starts executing the braking assistance control, the vehicle driving assistance apparatus 10 sets a target deceleration rate Gtgt and controls the braking force applied to the own vehicle 100 such that the own vehicle 100 is decelerated at the target deceleration rate Gtgt. The target deceleration rate Gtgt is a deceleration rate of the own vehicle 100 necessary to stop the own vehicle 100 before the forward object 200.

Figure 5A:
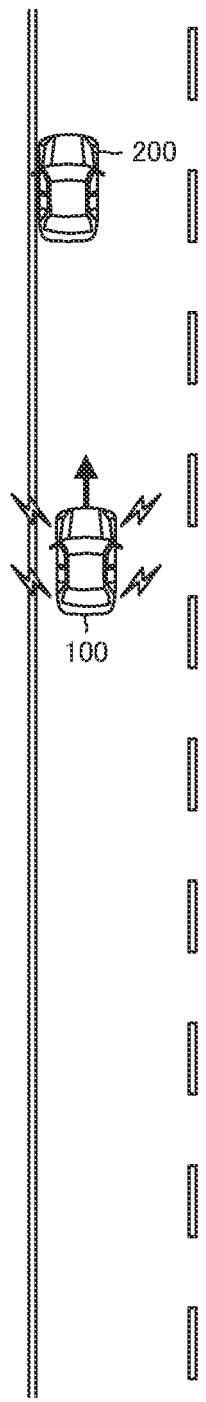
FIG. 5A is a view which shows a scene that the own vehicle starts to be decelerated by a braking assistance control.
Figure 5B:
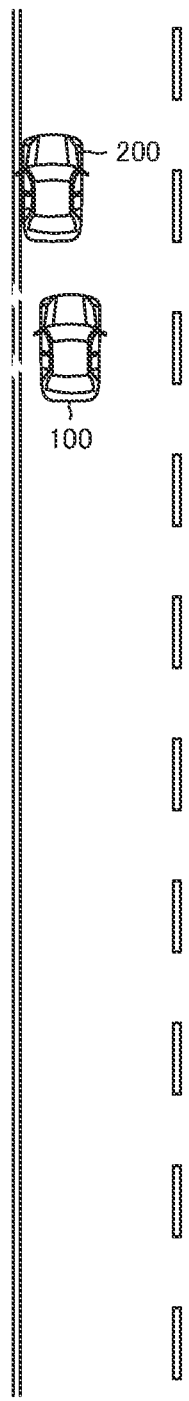
FIG. 5B is a view which shows a scene that the own vehicle is stopped by the braking assistance control.

Thereby, the driving force applied to the own vehicle 100 is controlled to zero, and the braking force is applied to the own vehicle 100. As a result, as shown in FIG. 5A, the own vehicle 100 starts to be decelerated. Then, as shown in FIG. 5B, the own vehicle 100 is stopped before the forward object 200. Thereby, a collision of the own vehicle 100 with the forward object 200 can be avoided.

<Stopped-State Keeping Control>

When the vehicle driving assistance apparatus 10 stops the own vehicle 100 by the braking assistance control, the vehicle driving assistance apparatus 10 terminates executing the braking assistance control and start executing a stopped-state keeping control. The stopped-state keeping control is a control to keep the own vehicle 100 stopped. In other words, the stopped-state keeping control is a control to keep the own vehicle 100 at a stopped state.

In this embodiment, the stopped-state keeping control is a control to continuously apply the braking force enough to keep the own vehicle 100 stopped to the own vehicle 100 by the braking apparatus 22. Alternatively, the stopped-state keeping control is a control to control the braking force applied to the own vehicle 100 by the braking apparatus 22 to zero and set the speed change device 24 to the parking state. Alternatively, the stopped-state keeping control is a control to control the braking force applied to the own vehicle 100 by the braking apparatus 22 to zero and apply the braking force to the own vehicle 100 by an electric parking brake.

The vehicle driving assistance apparatus 10 continues keeping the own vehicle 100 stopped by continuing executing the stopped-state keeping control until a predetermined time or a predetermined stopped-state keeping time T_th elapses since the vehicle driving assistance apparatus 10 starts to keep the own vehicle 100 stopped by the stopped-state keeping control. In other words, the vehicle driving assistance apparatus 10 continues keeping the own vehicle 100 stopped by continuing executing the stopped-state keeping control until a stopped-state keeping time T becomes equal to or longer than the predetermined stopped-state keeping time T_th. The stopped-state keeping time T is a time elapsing since the vehicle driving assistance apparatus 10 starts to keep the own vehicle 100 stopped by the stopped-state keeping control.

When the predetermined stopped-state keeping time T_th elapses since the vehicle driving assistance apparatus 10 starts to keep the own vehicle 100 stopped by the stopped-state keeping control, the vehicle driving assistance apparatus 10 terminates executing the stopped-state keeping control to terminate keeping the own vehicle 100 stopped. In other words, when the stopped-state keeping time T reaches the predetermined stopped-state keeping time T_th, the vehicle driving assistance apparatus 10 terminates executing the stopped-state keeping control to control the braking force applied to the own vehicle 100, thereby to cancel keeping the own vehicle 100 stopped.

<Setting Predetermined Stopped-State Keeping Time>

The own vehicle 100 may be stopped in the rail crossing by the braking assistance control. When the own vehicle 100 is stopped in the rail crossing for a long time, damage that a train collides with the own vehicle 100 may arise. Therefore, when the own vehicle 100 is stopped in the rail crossing, keeping the own vehicle 100 stopped should be early terminated in order to render the own vehicle 100 movable from there.

That is, when a place where the own vehicle 100 is stopped by the braking assistance control, is a place in a cancellation recommendation area, i.e., an area in which keeping the own vehicle 100 stopped is recommended to be early cancelled, an early cancellation of keeping the own vehicle 100 stopped is recommended. In other words, when the place where the own vehicle 100 is stopped by the braking assistance control, is a place in a termination recommendation area, i.e., an area in which executing the stopped-state keeping control is recommended to be early terminated, an early termination of executing the stopped-state keeping control is recommended.

Accordingly, when the place where the own vehicle 100 is stopped by the braking assistance control, is not the place in the cancellation recommendation area, the vehicle driving assistance apparatus 10 sets the predetermined stopped-state keeping time T_th to a standard time T_standard. On the other hand, when the place where the own vehicle 100 is stopped by the braking assistance control, is the place in the cancellation recommendation area, the vehicle driving assistance apparatus 10 sets the predetermined stopped-state keeping time T_th to a shorten time T_short shorter than the standard time T_standard.

That is, when the place where the own vehicle 100 is stopped by the braking assistance control, is the place in the cancellation recommendation area, the vehicle driving assistance apparatus 10 sets the predetermined stopped-state keeping time T_th to a shorter time, compared with when the place where the own vehicle 100 is stopped by the braking assistance control, is not the place in the cancellation recommendation area.

In this embodiment, the cancellation recommendation area includes an area in the rail crossing, an area in the tunnel, an area on the top of the slope, an area of the crosswalk, an area of the curved road, and an area in the traffic intersection.

Thereby, when the vehicle driving assistance apparatus 10 is stopped at the place in the cancellation recommendation area, keeping the own vehicle 100 stopped, is early cancelled. Therefore, the own vehicle 100 can be moved early to another place. Thus, damage due to keeping the own vehicle 100 stopped for a long time, can be prevented.

In this embodiment, the shorten time T_short may be set to a shorter time when a probability that the damage due to keeping the own vehicle 100 stopped arises, is high, compared with the probability that the damage due to keeping the own vehicle 100 stopped arises, is low. In particular, the shorten time T_short may be set to a time which decreases as the probability that the damage due to keeping the own vehicle 100 stopped arises, increases.

Further, the vehicle driving assistance apparatus 10 may be configured to terminate executing the stopped-state keeping control to cancel keeping the own vehicle 100 stopped when the vehicle driving assistance apparatus 10 detects that the driver consciously performs a driving operation such as an operation to the accelerator pedal 31 while the stopped-state keeping control is executed even before the stopped-state keeping time T does not reach the predetermined stopped-state keeping time T_th.

In this case, the vehicle driving assistance apparatus 10 may be configured not to terminate executing the stopped-state keeping control even when the vehicle driving assistance apparatus 10 detects that the driver consciously performs the driving operation such as the operation to the accelerator pedal 31 while the stopped-state keeping control is executed in a case where the forward object 200 still exists ahead of the own vehicle 100, or another object exists ahead of the own vehicle 100 and thus, the own vehicle 100 may collide with the forward object 200 or the other object due to a termination of executing the stopped-state keeping control if the accelerator pedal 31 is operated.

Further, the vehicle driving assistance apparatus 10 may be configured to set the predetermined stopped-state keeping time T_th to an extended time T_long, i.e., a time longer than the standard time T_standard when the place where the own vehicle 100 is stopped by the stopped-state keeping control, is a place in a continuation recommendation area. The continuation recommendation area is an area where it is not recommended to render the own vehicle 100 movable, i.e., an area where it is recommended to continue executing the stopped-state keeping control.

The continuation recommendation area is, for example, an area before the cancellation recommendation area. Therefore, the continuation recommendation area is an area before the rail crossing, an area before the tunnel, an area before the top of the slope, an area before the crosswalk, an area before the curved road, and an area before the traffic intersection.

<Specific Operations of Vehicle Driving Assistance Apparatus>

Figure 6:
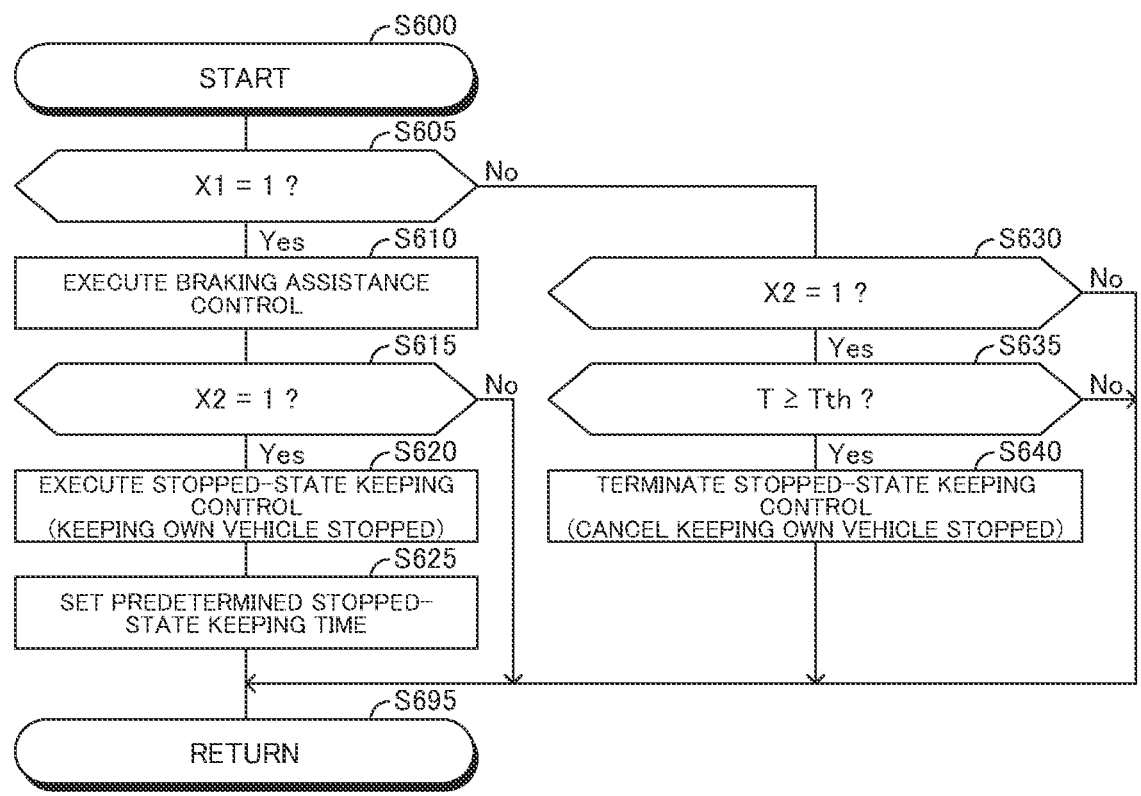
FIG. 6 is a view which shows a flowchart of a routine executed by the vehicle driving assistance apparatus according to the embodiment of the invention.

Next, specific operations of the vehicle driving assistance apparatus 10 will be described. The vehicle driving assistance apparatus 10 is configured to execute a routine shown in FIG. 6 with the predetermined calculation cycle. Thus, at a predetermined timing, the vehicle driving assistance apparatus 10 starts a process from a step S600 of the routine shown in FIG. 6 and proceeds with the process to a step S605 to determine whether a value of a braking assistance execution flag X1 is "1." The value of the braking assistance execution flag X1 is set to "1" when the braking assistance execution condition becomes satisfied. On the other hand, when the own vehicle 100 is stopped by the braking assistance control, the value of the braking assistance execution flag X1 is set to "0."

When the vehicle driving assistance apparatus 10 determines "Yes" at the step S605, the vehicle driving assistance apparatus 10 proceeds with the process to a step S610 to execute the braking assistance control. Then, the vehicle driving assistance apparatus 10 proceeds with the process to a step S615 to determine whether a value of a vehicle stop completion flag X2 is "1." The value of the vehicle stop completion flag X2 is set to "1" when the own vehicle 100 is stopped by the braking assistance control. On the other hand, when an execution of the braking assistance control is terminated, that is, keeping the own vehicle 100 stopped is canceled, the value of the vehicle stop completion flag X2 is set to "0."

When the vehicle driving assistance apparatus 10 determines "Yes" at the step S615, the vehicle driving assistance apparatus 10 terminates executing the braking assistance control and executes the stopped-state keeping control. That is, the vehicle driving assistance apparatus 10 keeps the own vehicle 100 stopped. Then, the vehicle driving assistance apparatus 10 proceeds with the process to a step S625 to set the predetermined stopped-state keeping time T_th as described above. Then, the vehicle driving assistance apparatus 10 proceeds with the process to a step S695 to terminate executing this routine once.

On the other hand, when the vehicle driving assistance apparatus 10 determines "No" at the step S615, the vehicle driving assistance apparatus 10 proceeds with the process directly to the step S695 to terminate executing this routine once.

When the vehicle driving assistance apparatus 10 determines "No" at the step S605, the vehicle driving assistance apparatus 10 proceeds with the process to a step S630 to determine whether the value of the vehicle stop completion flag X2 is "1."

When the vehicle driving assistance apparatus 10 determines "Yes" at the step S630, the vehicle driving assistance apparatus 10 proceeds with the process to a step S635 to determine whether the stopped-state keeping time T is equal to or longer than the predetermined stopped-state keeping time T_th.

When the vehicle driving assistance apparatus 10 determines "Yes" at the step S635, the vehicle driving assistance apparatus 10 proceeds with the process to a step S640 to terminate executing the stopped-state keeping control. That is, the vehicle driving assistance apparatus 10 cancels keeping the own vehicle 100 stopped. Then, the vehicle driving assistance apparatus 10 proceeds with the process to the step S695 to terminate executing this routine once.

On the other hand, when the vehicle driving assistance apparatus 10 determines "No" at the step S635, the vehicle driving assistance apparatus 10 proceeds with the process directly to the step S695 to terminate executing this routine once.

The specific operations of the vehicle driving assistance apparatus 10 have been described.

It should be noted that the invention is not limited to the aforementioned embodiments, and various modifications can be employed within the scope of the invention.

What is claimed is:

1. A vehicle driving assistance apparatus, comprising an electronic control unit configured to:
    execute a braking assistance control to forcibly apply a braking force to an own vehicle and stop the own vehicle when there is a probability that the own vehicle collides with an object ahead of the own vehicle; and
    execute a stopped-state keeping control to keep the own vehicle stopped when the own vehicle is stopped by the braking assistance control,
    wherein the electronic control unit is configured to:
        execute the stopped-state keeping control for at least as long as a standard time when a first condition is satisfied,
            the first condition being a condition that the own vehicle is stopped by the braking assistance control at a place in an area other than a termination recommendation area in which an execution of the stopped-state keeping control is recommended to be terminated; and
        execute the stopped-state keeping control for a time shorter than the standard time when a second condition is satisfied,
            the second condition being a condition that the own vehicle is stopped by the braking assistance control at a place in the termination recommendation area, wherein the termination recommendation area includes at least one of an area in a rail crossing, an area in a tunnel, an area on a top of a slope, and an area of a curved road.

2. The vehicle driving assistance apparatus as set forth in claim 1,
    wherein the electronic control unit is configured to execute the stopped-state keeping control for a time longer than the standard time when the first condition is satisfied and the own vehicle is stopped by the braking assistance control at a place in a continuation recommendation area, which is within an area before the termination recommendation area based on a sensor detection by the own vehicle.

3. The vehicle driving assistance apparatus as set forth in claim 1, wherein the electronic control unit is configured to determine whether the own vehicle is stopped at the place in the termination recommendation area, based on a present position of the own vehicle and map information.

4. A vehicle driving assistance method, comprising steps of:
    executing a braking assistance control to forcibly apply a braking force to an own vehicle and stop the own vehicle when there is a probability that the own vehicle collides with an object ahead of the own vehicle; and
    executing a stopped-state keeping control to keep the own vehicle stopped when the own vehicle is stopped by the braking assistance control,
    wherein the vehicle driving assistance method comprises steps of:
        executing the stopped-state keeping control for at least as long as a standard time when a first condition is satisfied,
            the first condition being a condition that the own vehicle is stopped by the braking assistance control at a place in an area other than a termination recommendation area in which an execution of the stopped-state keeping control is recommended to be terminated; and
        executing the stopped-state keeping control for a time shorter than the standard time when a second condition is satisfied, the second condition being a condition that the own vehicle is stopped by the braking assistance control at a place in the termination recommendation area, wherein the termination recommendation area includes at least one of an area in a rail crossing, an area in a tunnel, an area on a top of a slope, and an area of a curved road.

5. The vehicle driving assistance method as set forth in claim 4, wherein the stopped-state keeping control is executed for a time longer than the standard time when the first condition is satisfied and the own vehicle is stopped by the braking assistance control at a place in a continuation recommendation area, which is within an area before the termination recommendation area based on a sensor detection by the own vehicle.

6. A computer-readable storage medium storing a vehicle driving assistance program configured to:
 execute a braking assistance control to forcibly apply a braking force to an own vehicle and stop the own vehicle when there is a probability that the own vehicle collides with an object ahead of the own vehicle; and
 execute a stopped-state keeping control to keep the own vehicle stopped when the own vehicle is stopped by the braking assistance control,
 wherein the vehicle driving assistance program is configured to:
  execute the stopped-state keeping control for at least as long as a standard time when a first condition is satisfied,
  the first condition being a condition that the own vehicle is stopped by the braking assistance control at a place in an area other than a termination recommendation area in which an execution of the stopped-state keeping control is recommended to be terminated; and
 execute the stopped-state keeping control for a time shorter than the standard time when a second condition is satisfied,
  the second condition being a condition that the own vehicle is stopped by the braking assistance control at a place in the termination recommendation area, wherein the termination recommendation area includes at least one of an area in a rail crossing, an area in a tunnel, an area on a top of a slope, and an area of a curved road.

7. The computer-readable storage medium storing the vehicle driving assistance program as set forth in claim 6, wherein the stopped-state keeping control is executed for a time longer than the standard time when the first condition is satisfied and the own vehicle is stopped by the braking assistance control at a place in a continuation recommendation area, which is within an area before the termination recommendation area based on a sensor detection by the own vehicle.

* * * * *